United States Patent
Chawla et al.

(10) Patent No.: US 9,626,324 B2
(45) Date of Patent: Apr. 18, 2017

(54) INPUT/OUTPUT ACCELERATION IN VIRTUALIZED INFORMATION HANDLING SYSTEMS

(71) Applicants: Gaurav Chawla, Austin, TX (US); Robert Wayne Hormuth, Cedar Park, TX (US); Michael Karl Molloy, Round Rock, TX (US); Shyam T. Iyer, Austin, TX (US)

(72) Inventors: Gaurav Chawla, Austin, TX (US); Robert Wayne Hormuth, Cedar Park, TX (US); Michael Karl Molloy, Round Rock, TX (US); Shyam T. Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 336 days.

(21) Appl. No.: 14/326,122

(22) Filed: Jul. 8, 2014

(65) Prior Publication Data

US 2016/0012003 A1    Jan. 14, 2016

(51) Int. Cl.
*G06F 13/40*    (2006.01)
*G06F 13/10*    (2006.01)
(Continued)

(52) U.S. Cl.
CPC ...... *G06F 13/4027* (2013.01); *G06F 9/45558* (2013.01); *G06F 13/102* (2013.01);
(Continued)

(58) Field of Classification Search
CPC .... G06F 9/45558; G06F 13/102; G06F 13/28; G06F 13/4221; G06F 13/4022; G06F 9/4411; G06F 2009/45579; G06F 13/4027
See application file for complete search history.

(56) References Cited

U.S. PATENT DOCUMENTS 9,223,737 B1 *  12/2015 Serebrin ............... G06F 13/404
2009/0150528 A1   6/2009 Tanabe et al. ............... 709/221
(Continued)

OTHER PUBLICATIONS

International Search Report and Written Opinion issued in PCT/US2014/062907; 12 pages, Mar. 9, 2015.
(Continued)

*Primary Examiner* — Glenn A Auve
(74) *Attorney, Agent, or Firm* — Baker Botts L.L.P.

(57) ABSTRACT

Methods and systems for I/O acceleration on a virtualized information handling system include loading a storage virtual appliance as a virtual machine on a hypervisor. The hypervisor may execute using a first processor and a second processor. The storage virtual appliance is accessed by the hypervisor using a PCI-E device driver that is mapped to a first PCI-E NTB logical endpoint at the first processor. A second PCI-E device driver may be loaded on the storage virtual appliance that accesses the hypervisor and is mapped to a second PCI-E NTB logical endpoint at the second processor. A data transfer operation may be executed between a first memory space that is mapped to the first PCI-E NTB logical endpoint and a second memory space that is mapped to the second PCI-E NTB logical endpoint. The data transfer operation may be a read or a write operation.

21 Claims, 8 Drawing Sheets

(51) Int. Cl.
*G06F 13/28* (2006.01)
*G06F 13/42* (2006.01)
*G06F 9/455* (2006.01)
*G06F 9/44* (2006.01)

(52) U.S. Cl.
CPC .......... *G06F 13/28* (2013.01); *G06F 13/4221* (2013.01); *G06F 9/4411* (2013.01); *G06F 13/4022* (2013.01); *G06F 2009/45579* (2013.01)

(56) References Cited

U.S. PATENT DOCUMENTS

| | | | |
|---|---|---|---|
| 2012/0167082 A1 | 6/2012 | Kumar et al. | 718/1 |
| 2012/0271981 A1 | 10/2012 | Bayer et al. | 711/6 |
| 2014/0258577 A1 | 9/2014 | Egi | 710/113 |
| 2014/0331223 A1* | 11/2014 | Lee | G06F 13/105 718/1 |
| 2014/0351809 A1* | 11/2014 | Chawla | G06F 9/45533 718/1 |

OTHER PUBLICATIONS

International Search Report and Written Opinion issued in PCT/US2014/062914; 13 pages, Mar. 9, 2015.

Tu et al., "Secure I/O device sharing among virtual machines on multiple hosts", Computer Architecture, ACM, pp. 108-119, Jun. 23, 2013.

Bo et al., "TCNet: cross-node virtual machine communication acceleration", Proceedings of the ACM International Conference on Computing Frontiers, CF '13, 16 pages, May 16, 2013.

Regula, "Using Non-transparent Bridging in PCI Express System 4 Device Identification and Transparent/Non-transparent Mode Control", PLX Technology, Inc.; 32 pages, Jun. 1, 2004.

Amit et al., "IOMMU: Strategies for Mitigating the IOTLB Bottleneck", Technion—Israel Institute of Technology; published in WIOSCA 2010—Sixth Annual Workshop on the Interaction between Operating systems and computer Architecture (2010), pp. 1-12, Jun. 21, 2010.

International Preliminary Report and Written Opinion issued in PCT/US2014/062914; 8 pages, issued Jan. 10, 2017; received Jan. 18, 2017.

* cited by examiner

FIG. 6

INPUT/OUTPUT ACCELERATION IN VIRTUALIZED INFORMATION HANDLING SYSTEMS

BACKGROUND

Field of the Disclosure

This disclosure relates generally to virtualized information handling systems and more particularly to a system and method for input/output (I/O) acceleration in virtualized information handling systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Increasingly, information handling systems are deployed in architectures that allow multiple operating systems to run on a single information handling system. Labeled "virtualization," this type of information handling system architecture decouples software from hardware and presents a logical view of physical hardware to software. In a virtualized information handling system, a single physical server may instantiate multiple, independent virtual servers. Server virtualization is enabled primarily by a piece of software (often referred to as a "hypervisor") that provides a software layer between the server hardware and the multiple operating systems, also referred to as guest operating systems (guest OS). The hypervisor software provides a container that presents a logical hardware interface to the guest operating systems. An individual guest OS, along with various applications or other software executing under the guest OS, may be unaware that execution is occurring in a virtualized server environment (as opposed to a dedicated physical server). Such an instance of a guest OS executing under a hypervisor may be referred to as a "virtual machine" or "VM".

Often, virtualized architectures may be employed for numerous reasons, such as, but not limited to: (1) increased hardware resource utilization; (2) cost-effective scalability across a common, standards-based infrastructure; (3) workload portability across multiple servers; (4) streamlining of application development by certifying to a common virtual interface rather than multiple implementations of physical hardware; and (5) encapsulation of complex configurations into a file that is easily replicated and provisioned, among other reasons. As noted above, the information handling system may include one or more operating systems, for example, executing as guest operating systems in respective virtual machines.

An operating system serves many functions, such as controlling access to hardware resources and controlling the execution of application software. Operating systems also provide resources and services to support application software. These resources and services may include data storage, support for at least one file system, a centralized configuration database (such as the registry found in Microsoft Windows operating systems), a directory service, a graphical user interface, a networking stack, device drivers, and device management software. In some instances, services may be provided by other application software running on the information handling system, such as a database server.

The information handling system may include multiple processors connected to various devices, such as Peripheral Component Interconnect ("PCI") devices and PCI express ("PCI-E") devices. The operating system may include one or more drivers configured to facilitate the use of the devices. As mentioned previously, the information handling system may also run one or more virtual machines, each of which may instantiate a guest operating system. Virtual machines may be managed by a virtual machine manager, such as, for example, a hypervisor. Certain virtual machines may be configured for device pass-through, such that the virtual machine may utilize a physical device directly without requiring the intermediate use of operating system drivers.

Conventional virtualized information handling systems may benefit from increased performance of virtual machines. Improved performance may also benefit virtualized systems where multiple virtual machines operate concurrently. Applications executing under a guest OS in a virtual machine may also benefit from higher performance from certain computing resources, such as storage resources.

SUMMARY

In one aspect, a disclosed method is executed using at least two processors, including a first processor and a second processor. The method may include loading a storage virtual appliance as a virtual machine on a hypervisor executing using the first processor and the second processor. The storage virtual appliance may be accessed by the hypervisor using a first Peripheral Component Interconnect Express (PCI-E) device driver that is mapped to a PCI-E non-transparent bridge (NTB) at a first PCI-E NTB logical endpoint at the first processor. The method may include loading a second PCI-E device driver on the storage virtual appliance that accesses the hypervisor and is mapped to the PCI-E NTB at a second PCI-E NTB logical endpoint at the second processor. The method may further include executing a data transfer operation between a first memory space that is mapped to the first PCI-E NTB logical endpoint and a second memory space that is mapped to the second PCI-E NTB logical endpoint. The hypervisor may execute in the first memory space. The storage virtual appliance may execute in the second memory space. The PCI NTB may provide address translation between the first memory space and the second memory space.

Other disclosed aspects include article of manufacture comprising a non-transitory computer-readable medium storing instructions executable by at least two processors, and an information handling system comprising a processor subsystem including a first processor and a second processor having access to a memory subsystem storing instructions executable by the processor subsystem.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, device "12-1" refers to an instance of a device class, which may be referred to collectively as devices "12" and any one of which may be referred to generically as a device "12".

As noted previously, current virtual information handling systems may demand higher performance from computing resources, such as storage resources used by applications executing under guest operating systems. Many virtualized server platforms may desire to provide storage resources to such applications in the form of software executing on the same server where the applications are executing, which may offer certain advantages by bringing data closest to the application. Such software-defined storage may further enable new technologies, such as, but not limited to: (1) flash caches and cache networks using solid state devices (SSD) to cache storage operations and data; (2) virtual storage area networks (SAN); and (3) data tiering by storing data across local storage resources, SAN storage, and network storage, depending on I/O load and access patterns. Server virtualization has been a key enabler of software-defined storage by enabling multiple workloads to run on a single physical machine. Such workloads also benefit by provisioning storage resources closest to the application accessing data stored on the storage resources.

Storage software providing such functionality may interact with multiple lower level device drivers. For example: a layer on top of storage device drivers may provide access to server resident hard drives, flash SSD drives, non-volatile memory devices, and/or SAN storage using various types of interconnect fabric, (i.e., iSCSI, Fibre Channel, Fibre Channel over Ethernet, etc.). In another example, a layer on top of network drivers may provide access to storage software running on other server instances (i.e., access to a cloud). Such driver-based implementations have been challenging from the perspective of supporting multiple hypervisors and delivering adequate performance. Certain hypervisors in use today may not support third-party development of drivers, which may preclude an architecture based on optimized filter drivers in the hypervisor kernel. Other hypervisors may have different I/O architectures and device driver models, which may present challenges to developing a unified storage software for various hypervisor platforms.

Another solution is to implement the storage software as a virtual machine with pass-through access to physical storage devices and resources. However, such a solution may face serious performance issues when communicating with applications executing on neighboring virtual machines, due to low data throughput and high latency in the hypervisor driver stack. Thus, even though the underlying storage resources may deliver substantially improved performance, such as flash caches and cache networks, the performance advantages may not be experienced by applications in the guest OS using typical hypervisor driver stacks.

As will be described in further detail, the inventors of the present disclosure have developed novel methods and systems disclosed herein for improving access to storage resources by using a storage virtual appliance that provides managed access to local and remote storage resources, while utilizing direct memory access (DMA) for storage operations to and from a guest OS in a virtual information handling system. Direct memory access involves the transfer of data to/from system memory without significant involvement by a processor subsystem, thereby improving data throughput and reducing a workload of the processor subsystem. Specifically, a mechanism for I/O acceleration is disclosed using processor-integrated I/O and DMA engines to implement PCI-E Non-Transparent Bridging (NTB). As will be described in further detail, the present disclosure is directed to accelerating I/O from an application executing in a VM via a storage virtual appliance (SVA). In other embodiments, the I/O acceleration disclosed herein may be applicable for scenarios where two software modules or drivers running in an operating system need to send messages or data to each other, but are restricted by OS performance limitations.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2, 3, 4A, 4B, 5A, 5B, and 6 wherein like numbers are used to indicate like and corresponding parts.

Figure 1:
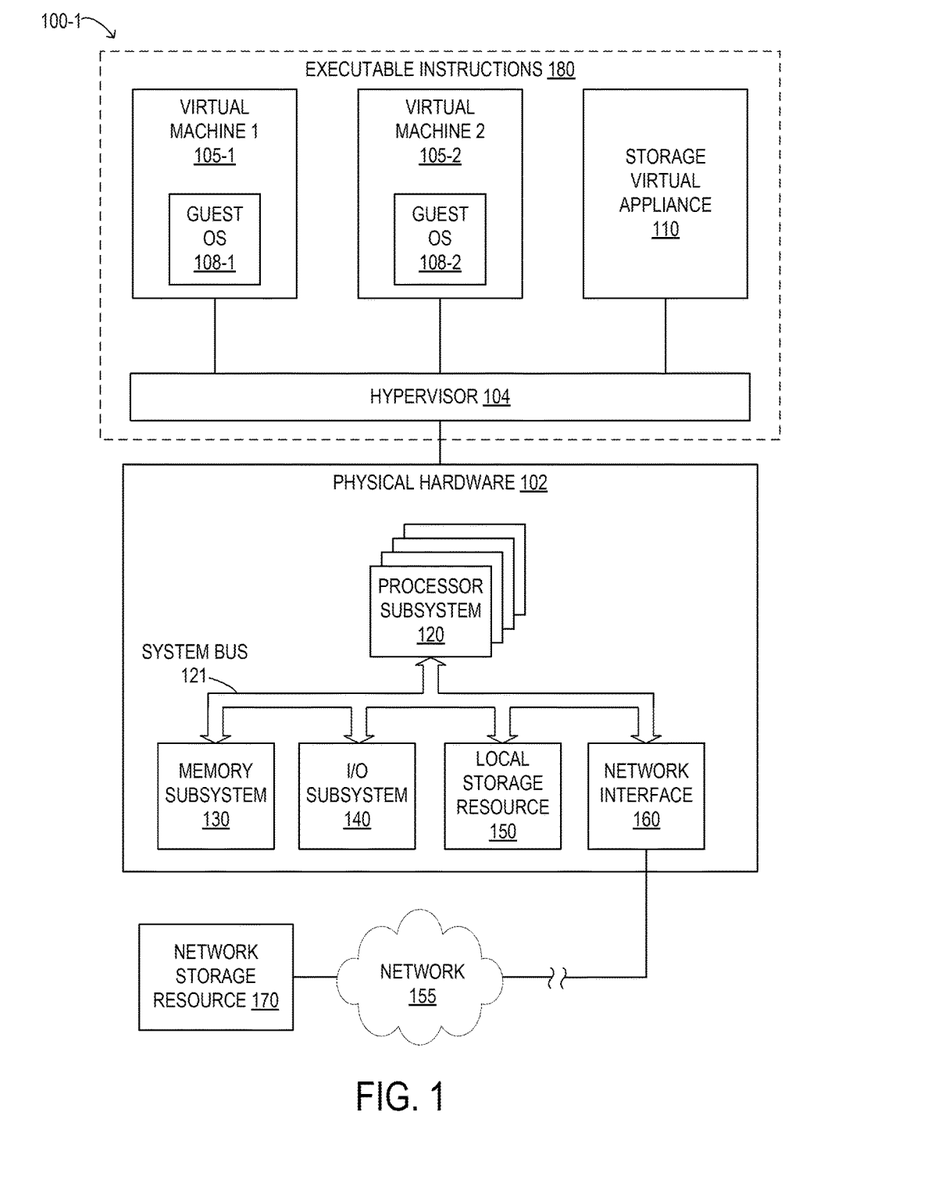
FIG. 1 is a block diagram of selected elements of an embodiment of an information handling system for I/O acceleration, as described herein.

Referring now to the drawings, FIG. 1 illustrates a block diagram depicting selected elements of an embodiment of system 100-1 for I/O acceleration using a storage virtual appliance, in accordance with the present disclosure. As depicted in FIG. 1, system 100-1 represents an information handling system comprising physical hardware 102, executable instructions 180 (including hypervisor 104, one or more virtual machines 105, and storage virtual appliance 110). Also shown with system 100-1 are external or remote elements, namely, network 155 and network storage resource 170.

As shown in FIG. 1, components of physical hardware 102 may include, but are not limited to, processor subsystem 120, which may comprise one or more processors, and system bus 121 that communicatively couples various system components to processor subsystem 120 including, for example, a memory subsystem 130, an I/O subsystem 140, local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 is a suitable system, apparatus, or device operable to serve as an interface between information handling system 100-1 and a network 155. Network interface 160 enables information handling system 100-1 to communicate over network 155 using a suitable transmission protocol or standard, including, but not limited to, transmission protocols or standards enumerated below with respect to the discussion of network 155. In some embodiments, network interface 160 may be communicatively coupled via network 155 to network storage resource 170. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data or messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 155 and its various components may be implemented using hardware, software, or any combination thereof.

As depicted in FIG. 1, processor subsystem 120 comprises a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and execute program instructions or process data stored locally (e.g., in memory subsystem 130 or another component of physical hardware 102). In the same or alternative embodiments, processor subsystem 120 may interpret and execute program instructions or process data stored remotely (e.g., in network storage resource 170). In particular, processor subsystem 120 may represent a multi-processor configuration that includes at least a first processor and a second processor (see also FIG. 2).

Also in FIG. 1, memory subsystem 130 comprises a system, device, or apparatus operable to retain and retrieve program instructions and data for a period of time (e.g., computer-readable media). Memory subsystem 130 may comprise random access memory (RAM), electrically erasable programmable read-only memory (EEPROM), a PCM-CIA card, flash memory, magnetic storage, opto-magnetic storage, or a suitable selection or array of volatile or non-volatile memory that retains data after power to an associated information handling system, such as system 100-1, is powered down. Local storage resource 150 comprises computer-readable media (e.g., hard disk drive, floppy disk drive, CD-ROM, and/or other type of rotating storage media, flash memory, EEPROM, and/or another type of solid state storage media) and is generally operable to store instructions and data. Likewise, network storage resource 170 comprises computer-readable media (e.g., hard disk drive, floppy disk drive, CD-ROM, or other type of rotating storage media, flash memory, EEPROM, or other type of solid state storage media) and may be generally operable to store instructions and data. In system 100-1, I/O subsystem 140 comprises a system, device, or apparatus generally operable to receive and transmit data to or from or within system 100-1. I/O subsystem 140 may represent, for example, any one or more of a variety of communication interfaces, graphics interfaces, video interfaces, user input interfaces, and peripheral interfaces.

In FIG. 1, hypervisor 104 comprises software (i.e., executable code or instructions) and firmware generally operable to allow multiple operating systems to run on a single information handling system at the same time. This operability is generally allowed via virtualization, a technique for hiding the physical characteristics of information handling system resources from the way in which other systems, applications, or end users interact with those resources. Hypervisor 104 may be one of a variety of proprietary and/or commercially available virtualization platforms, including, but not limited to, IBM's Z/VM, XEN, ORACLE VM, VMWARE's ESX SERVER, L4 MICROKERNEL, TRANGO, MICROSOFT's HYPER-V, SUN's LOGICAL DOMAINS, HITACHI's VIRTAGE, KVM, VMWARE SERVER, VMWARE WORKSTATION, VMWARE FUSION, QEMU, MICROSOFT's VIRTUAL PC and VIRTUAL SERVER, INNOTEK's VIRTUALBOX, and SWSOFT's PARALLELS WORKSTATION and PARALLELS DESKTOP. In one embodiment, hypervisor 104 may comprise a specially designed operating system (OS) with native virtualization capabilities. In another embodiment, hypervisor 104 may comprise a standard OS with an incorporated virtualization component for performing virtualization. In another embodiment, hypervisor 104 may comprise a standard OS running alongside a separate virtualization application. In this embodiment, the virtualization application of hypervisor 104 may be an application running above the OS and interacting with physical hardware 102 only through the OS. Alternatively, the virtualization application of hypervisor 104 may, on some levels, interact indirectly with physical hardware 102 via the OS, and, on other levels, interact directly with physical hardware 102 (e.g., similar to the way the OS interacts directly with physical hardware 102, and as firmware running on physical hardware 102), also referred to as device pass-through. By using device pass-through, the virtual machine may utilize a physical device directly without the intermediate use of operating system drivers. As a further alternative, the virtualization application of hypervisor 104 may, on various levels, interact directly with physical hardware 102 (e.g., similar to the way the OS interacts directly with physical hardware 102, and as firmware running on physical hardware 102) without utilizing the OS, although still interacting with the OS to coordinate use of physical hardware 102.

As shown in FIG. 1, virtual machine 1 105-1 represents a host for guest OS 108-1, while virtual machine 2 105-2 represents a host for guest OS 108-2. To allow multiple operating systems to be executed on system 100-1 at the same time, hypervisor 104 may virtualize certain hardware resources of physical hardware 102 and present virtualized computer hardware representations to each of virtual machines 105. In other words, hypervisor 104 may assign to each of virtual machines 105, for example, one or more processors from processor subsystem 120, one or more regions of memory in memory subsystem 130, one or more components of I/O subsystem 140, etc. The virtualized hardware representation presented to each of virtual machines 105 may comprise a mutually exclusive (i.e., disjoint or non-overlapping) set of hardware resources per virtual machine 105 (e.g., no hardware resources are shared between virtual machines 105). In other embodiments, the virtualized hardware representation may comprise an overlapping set of hardware resources per virtual machine 105 (e.g., one or more hardware resources are shared by two or more virtual machines 105).

In one embodiment, hypervisor 104 may assign hardware resources of physical hardware 102 statically, such that certain hardware resources are assigned to certain virtual machines, and this assignment does not vary over time. Additionally or alternatively, hypervisor 104 may assign hardware resources of physical hardware 102 dynamically, such that the assignment of hardware resources to virtual machines varies over time, for example, in accordance with the specific needs of the applications running on the individual virtual machines. Additionally or alternatively, hypervisor 104 may keep track of the hardware-resource-to-virtual-machine mapping, such that hypervisor 104 is able to determine the virtual machines to which a given hardware resource of physical hardware 102 has been assigned.

In FIG. 1, each of virtual machines 105 may respectively include an instance of guest operating system (guest OS) 108, along with any applications or other software running on guest OS 108. Each guest OS 108 may represent an OS compatible with and supported by hypervisor 104, even when guest OS 108 is incompatible to a certain extent with physical hardware 102, which is virtualized by hypervisor 104. In addition, each guest OS 108 may be a separate instance of the same operating system or an instance of a different operating system. For example, in one embodiment, each guest OS 108 may comprise a LINUX OS. As another example, guest OS 108-1 may comprise a LINUX OS, guest OS 108-1 may comprise a MICROSOFT WINDOWS OS, and while another guest OS on another virtual machine (not shown) may comprise a VXWORKS OS. Although system 100-1 is depicted as having two virtual machines 105-1, 105-2, and storage virtual appliance 110, it will be understood that, in particular embodiments, different numbers of virtual machines 105 may be executing on information handling system 100 at any given time.

In FIG. 1, storage virtual appliance 110 may represent storage software executing on hypervisor 104. Although storage virtual appliance 110 may be implemented as a virtual machine, and may execute in a similar environment and address space as described above with respect to virtual machines 105, storage virtual appliance 110 may be dedicated to providing access to storage resources to instances of guest OS 108. Thus storage virtual appliance 110 may not itself be a host for a guest OS that is provided as a resource to users, but may be an embedded feature of information handling system 100. It will be understood, however, that storage virtual appliance 110 may include an embedded virtualized OS (not shown) similar to various implementations of guest OS 108 described previously herein. In particular, storage virtual appliance 110 may enjoy pass-through device access to various devices and interfaces for accessing storage resources (local and/or remote) and may be enabled to provide logical communication connections between desired storage resources and guest OS 108 using direct memory access for very high data throughput rates and very low latency transfer operations, as described herein.

In operation of system 100 shown in FIG. 1, hypervisor 104 of information handling system 100 may virtualize the hardware resources of physical hardware 102 and present virtualized computer hardware representations to each of virtual machines 105. Each guest OS 108 of virtual machines 105 may then begin to operate and run applications and/or other software. While operating, each guest OS 108 may utilize one or more hardware resources of physical hardware 102 assigned to the respective virtual machine by hypervisor 104. Each guest OS 108 and/or application executing under guest OS 108 may be presented with storage resources that are managed by storage virtual appliance 110. In other words, storage virtual appliance 110 may be enabled to mount and partition various combinations of physical storage resources, including local storage resources and remote storage resources, and present these physical storage resources as desired logical storage devices for access by guest OS 108 (see also FIG. 2). In particular, storage virtual appliance 110 may enable I/O acceleration using processor DMA and PCI-E NTB for access to storage resources by applications executing under guest OS 108 of virtual machine 105. Also, the features of storage virtual appliance 110 described herein may further allow for implementation in a manner that is independent, or largely independent, of any particular implementation of hypervisor 104.

Figure 2:
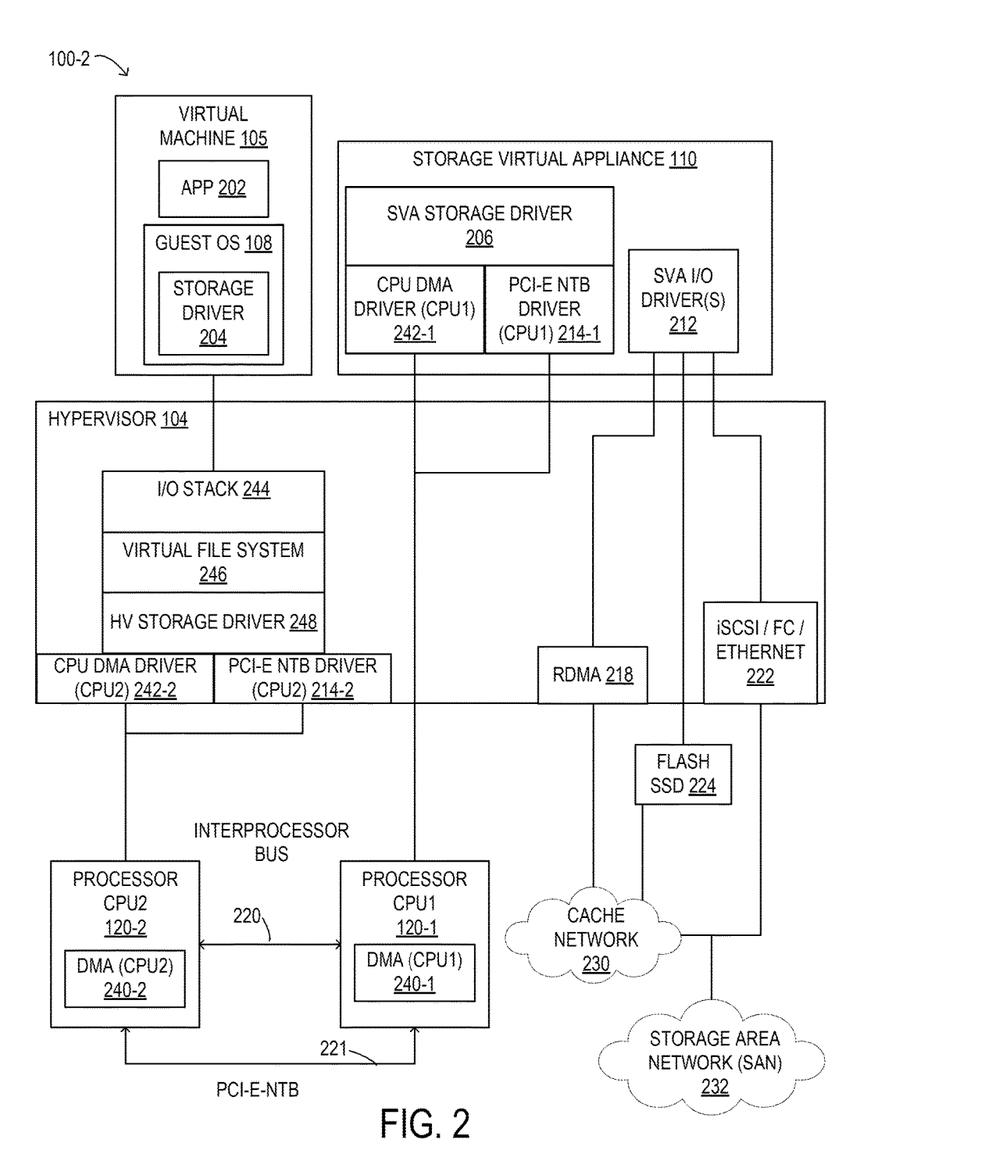
FIG. 2 is a block diagram of selected elements of an embodiment of an information handling system for I/O acceleration, as described herein.

Referring now to FIG. 2, a block diagram of selected elements of an embodiment of system 100-2 is illustrated. In FIG. 2, system 100-2 may represent an information handling system that is an embodiment of system 100-1 (see FIG. 1). As shown, system 100-2 includes further details regarding the operation and use of storage virtual appliance 110, while other elements shown in system 100-1 have been omitted from FIG. 2 for descriptive clarity. In FIG. 2, for example, virtual machine 105 and guest OS 108 are shown in singular, though they may represent any number of instances of virtual machine 105 and guest OS 108.

In FIG. 2, virtual machine 105 is shown executing app 202 and guest OS 108 under which storage driver 204 is installed and loaded. Storage driver 204 enables virtual machine 105 to access storage resources via I/O stack 244, virtual file system 246, and hypervisor (HV) storage driver 248, which are loaded into hypervisor 104. I/O stack 244 provides interfaces to VM-facing I/O by hypervisor 104 to interact with storage driver 204 executing on virtual machine 105. Virtual file system 246 is a file system provided by hypervisor 104, for example, for access by guest OS 108.

As shown in FIG. 2, virtual file system 210 interacts with HV storage driver 248, which is configured to access resources of processor CPU2 120-2. Specifically, HV storage driver 248 may access processor CPU2 120-2 using CPU DMA driver 242-2 or PCI-NTB driver 214-2. CPU DMA driver 242-2 provides support for programming DMA (CPU2) 240-2 representing a DMA engine included within processor CPU2 120-2. PCI-E NTB driver 214-2 provides support for programming PCI-E NTB 221 representing an alternative to interprocessor bus 220 for communicating between processor CPU2 120-2 and processor CPU1 120-1. In particular, DMA 240 and PCI-E NTB 221 enable DMA transfers at high data rates while subjecting processors 120 with minimal workload, and thus, represent an efficient mechanism for I/O acceleration, as described herein. Furthermore, because each processor 120 operates in an individual physical memory space (see FIG. 3) with a local bank of physical memory (not shown), the methods described herein for I/O acceleration may prevent access by processor 120-2 to memory banks of processor 120-1 and vice versa, which may further reduce undesired interprocessor communication and redundant memory access operations that represent undesirable workload by processors 120.

As shown in FIG. 2, PCI-E NTB 221 may represent a non-transparent bridge with a host on both sides of the bridge, shown as processor CPU1 120-1 and processor CPU2 120-2. As noted above, host of PCI-E NTB 221 has its own independent address space (i.e. memory space), and may have visibility into a certain portion of the address space of the other host. Each host may treat the other host as an endpoint of PCI-E NTB 221 and may map an address segment of the other host into its native memory space. In given embodiments, SVA storage driver 206 on storage virtual appliance 110 may represent one port at an endpoint of PCI-E NTB 221, referred to herein as CPU1 NTB, while HV storage driver 248 may represent another port at another endpoint of PCI-E NTB 221, referred to herein as CPU2 NTB.

Additionally, in the exemplary embodiment of FIG. 2, storage virtual appliance 110 is shown including SVA storage driver 206 and SVA I/O drivers 212. In the exemplary arrangement of FIG. 2, SVA storage driver 206 is configured to access resources of processor CPU1 120-1. Specifically, SVA storage driver 206 may access processor CPU1 120-1 using CPU DMA driver 242-1 or PCI-NTB driver 214-1. CPU DMA driver 242-1 provides support for programming DMA (CPU2) 240-1 representing a DMA engine included within processor CPU1 120-1.

In FIG. 2, SVA I/O drivers 212 represent 'back-end' drivers that enable storage virtual appliance 100 to access and provide access to various storage resources. As shown, SVA I/O drivers 212 have pass-through access to remote direct memory access (RDMA) 218, iSCSI/Fibre Channel (FC)/Ethernet 222, and flash SSD 224. For example, RDMA 218 or flash SSD 224 or iSCSI/FC/Ethernet 222 may participate in cache network 230, which may be a high performance network for caching storage operations and/or data between a plurality of information handling systems (not shown), such as system 100. As shown, iSCSI/FC/Ethernet 222 may also provide access to storage area network (SAN) 240, which may include various external storage resources, such as network-accessible storage arrays.

Figure 3:
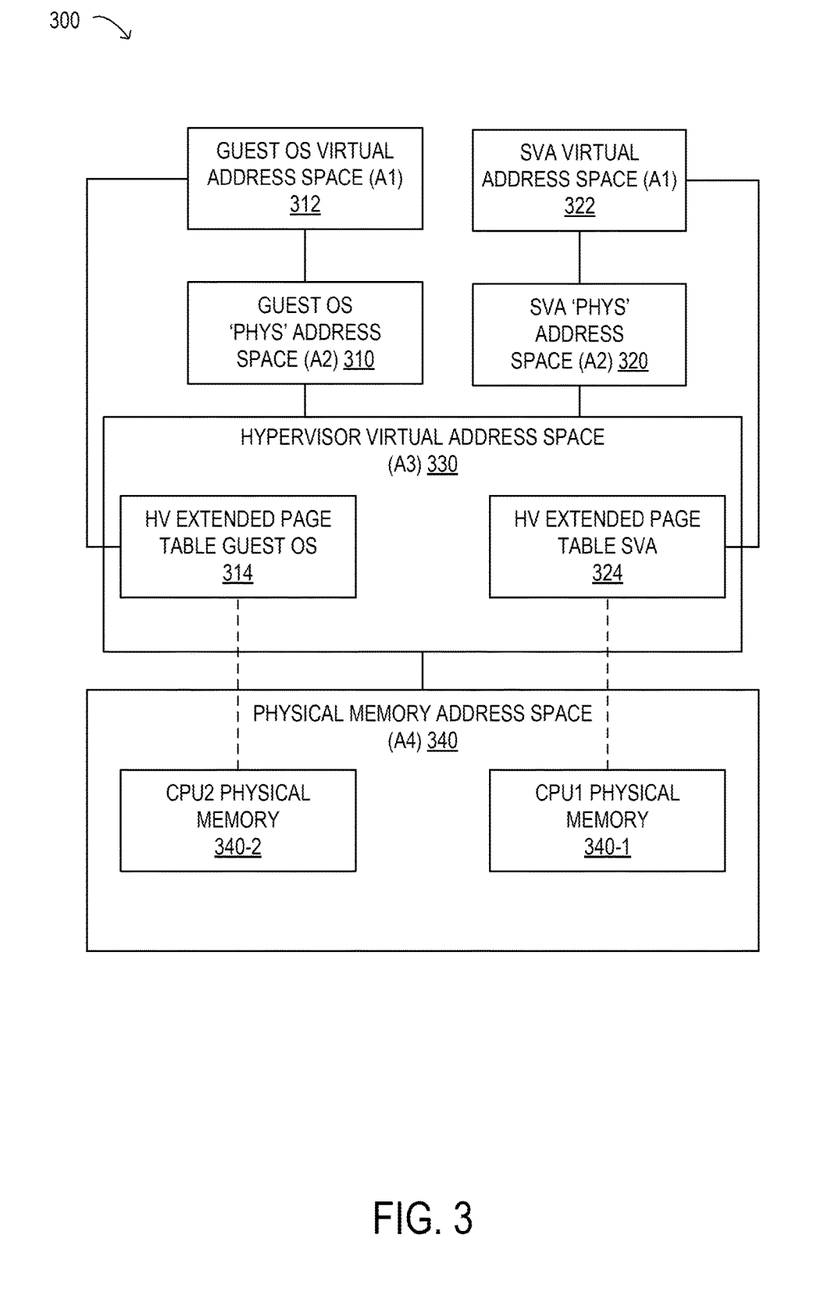
FIG. 3 is a block diagram of selected elements of an embodiment of a memory space for I/O acceleration, as described herein.

Referring now to FIG. 3, a block diagram of selected elements of an embodiment of memory space 300 is illustrated. In FIG. 3, memory space 300 depicts various memory addressing spaces, or simply 'address spaces' for various virtualization layers included in information handling system 100 (see FIGS. 1 and 2).

As shown in FIG. 3, memory space 300 includes physical memory address space (A4) 340 for addressing physical memory. As noted above, when a first processor and a second processor are used in information handling system 100, each processor may have an independent bank of physical memory, shown as CPU physical memory 340-1 and CPU2 physical memory 340-2. Since hypervisor 104 executes on physical computing resources, hypervisor virtual address space (A3) 330 represents a virtual address space that is based on physical memory address space (A4) 340. A virtual address space enables addressing of larger memory spaces with a limited amount of physical memory and may rely upon an external storage resource (not shown in FIG. 3) for offloading or caching operations. Corresponding to the arrangement shown in FIG. 2, HV extended page table guest OS 314 enables hypervisor objects associated with guest OS 108, such as HV storage driver 248, to resolve physical memory addresses associated with CPU2. Similarly, HV extended page table SVA 324 enables hypervisor objects associated with storage virtual appliance 110, such as SVA storage driver 206, to resolve physical memory addresses associated with CPU1. Hypervisor virtual address space (A3) 330 represents an internal address space used by hypervisor 104. Hypervisor 104 may further generate so-called 'physical' address spaces within hypervisor virtual address space (A3) 330 and present these 'physical' address space to virtual machines 105 and storage virtual appliance 110 for virtualized execution. From the perspective of virtual machines 105 and storage virtual appliance 110, the 'physical' address space provided by hypervisor 104 may appear as a real physical memory space. As shown, guest OS 'phys' address space (A2) 310 and SVA 'phys' address space (A2) 320 represent the 'physical' address space provided by hypervisor 104 to guest OS 108 and storage virtual appliance 110, respectively. Finally, guest OS virtual address space (A1) 312 represents a virtual address space that guest OS 108 implements using guest OS 'phys' address space (A2) 310. SVA virtual address space (A1) 322 represents a virtual address space that storage virtual appliance 110 implements using SVA 'phys' address space (A2) 320.

It is noted that the labels A1, A2, A3, and A4 refer to specific hierarchical levels of real or virtualized memory spaces, as described above, with respect to information handling system 100. For descriptive clarity, the labels A1, A2, A3, and A4 are used in subsequent FIGS. 4A, 4B, 5A, and 5B to refer to the specific hierarchical levels of memory spaces and are annotated for association with specific objects and elements (e.g., SVA(A2), HV(A4), G-OS(A2), etc.).

Figure 4A:
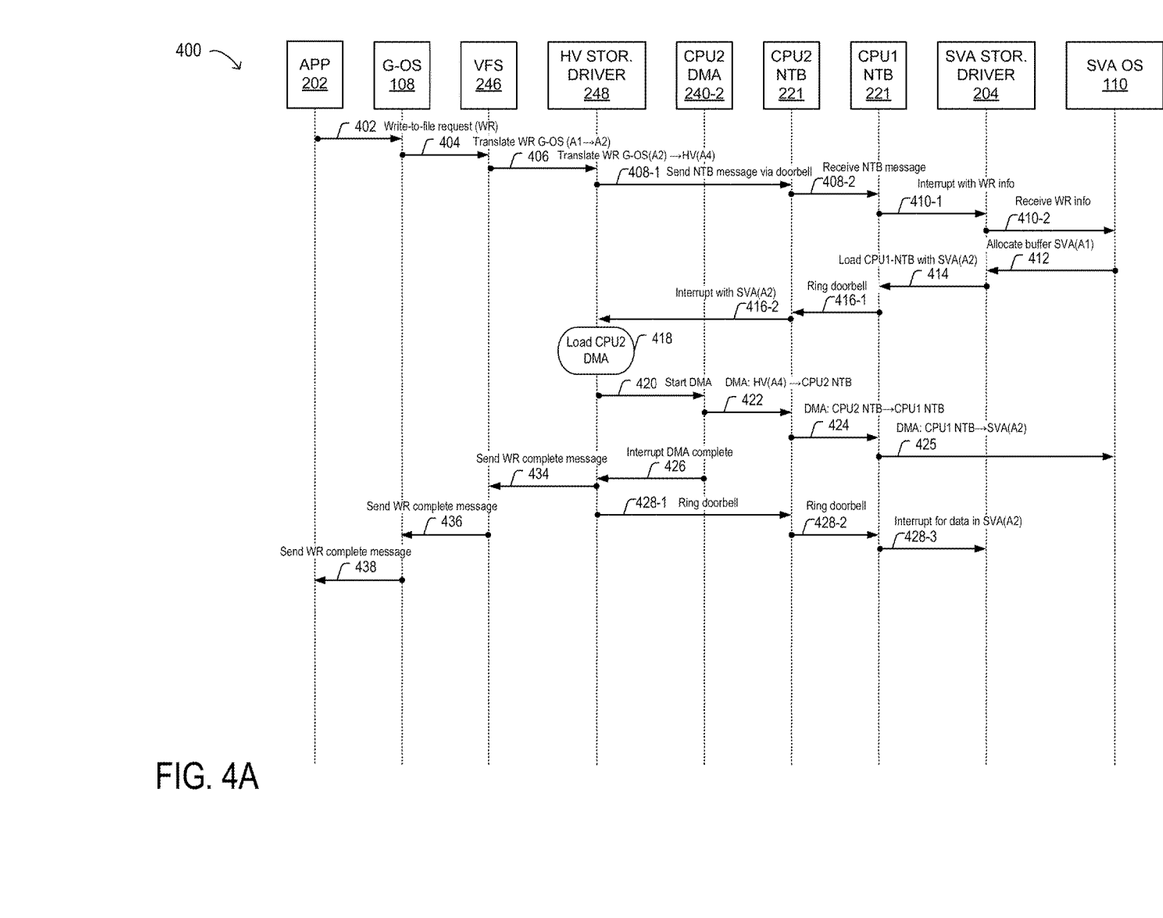
FIG. 4A is a process diagram of selected elements of an embodiment of I/O acceleration, as described herein, for a write operation.

Referring now to FIG. 4A, a block diagram of selected elements of an embodiment of process diagram 400 is illustrated. In FIG. 4A, process diagram 400 depicts operations for I/O acceleration in information handling system 100 (see FIGS. 1 and 2), as described herein. Specifically, process diagram 400 depicts I/O acceleration for a write operation to a storage resource by app 202 in which DMA programming is performed by HV storage driver 248.

In process diagram 400, app 202 may issue a write-to-file request (WR) for a target file stored on a target device at step 402 to guest OS 108, which occurs in the address space A1 or G-OS(A1). Then, guest OS 108 translates the WR from G-OS(A1) to G-OS(A2) at step 404 and forwards the WR to virtual file system (VFS) 246. Additionally at step 404, a file pointer and offset included with the WR is converted to a virtual disk block address for the target device on which the target file for the WR is stored. At step 406, VFS 246 translates the virtual disk block address to a physical disk block address, translates the WR from G-OS(A2) to HV(A4), and sends the WR to HV storage driver 248, along with the translated addresses. Additionally, at step 406, VFS 246 pins HV(A4) for write data to write for the WR. At step 408-1 HV storage driver 248 sends an NTB message (i.e., ring doorbell) with the physical block address and a buffer size (i.e., WR info) via CPU2 NTB 221. At step 408-2, the NTB message is received by CPU1 NTB 221. At step 410-1, CPU1 NTB 221 interrupts SVA storage driver 204 and SVA storage driver 204 reads the NTB message. At step 410-2, SVA OS 110 receives the WR info. At step 412, SVA OS 110 allocates a buffer in SVA(A1) of the buffer size given in the WR info and records a corresponding SVA(A2) address for the buffer. At step 414, SVA storage driver 204 loads CPU1-NTB 221 with the SVA(A2) address for the buffer. Then, at step 416-1, CPU1 NTB 221 performs an NTB ring doorbell. At step 416-2, CPU2 NTB 221 interrupts HV storage driver 248 with the SVA(A2) address. At step 418, HV storage driver 248 loads CPU2 DMA 240-2 for the DMA operation. At step 420, the DMA operation is started.

At step 422, the DMA operation proceeds with a transfer of the write data from HV(A4) to CPU2 NTB 221. At step 424, the DMA operation proceeds with a transfer of the write data from CPU2 NTB 221 to CPU1 NTB 221. At step 425, the DMA operation proceeds with a transfer of the write data from CPU1 NTB 221 to SVA(A2) at SVA OS 110. At step 426, CPU2 DMA 240-2 interrupts HV storage driver 248 with an interrupt indicating that the DMA operation is completed. At step 428-1, HV storage driver 248 performs an NTB ring doorbell at CPU2 NTB 221. At step 428-2, CPU2 NTB 221 rings a doorbell at CPU1 NTB 221. At step 428-3, CPU1 NTB 221 interrupts SVA storage driver 204 for the write data in SVA(A2). Then, the write data may be written to the target device (not shown). At step 434, HV storage driver 248 sends a WR completion message to VFS 246. At step 436, VFS 246 sends a WR completion message to G-OS 108. At step 438, G-OS 108 sends a WR completion message to app 102.

Figure 4B:
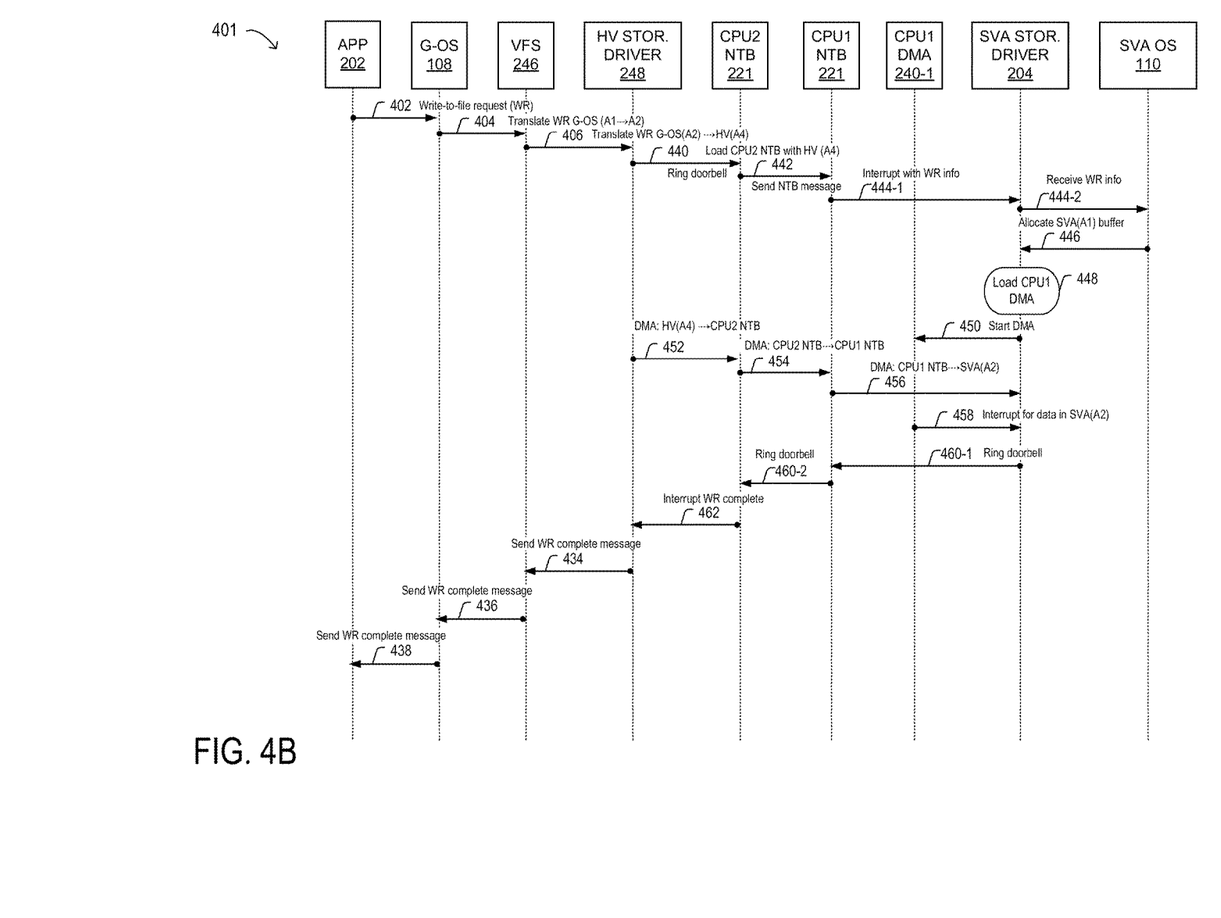
FIG. 4B is a process diagram of selected elements of an embodiment of I/O acceleration, as described herein, for a write operation.

Referring now to FIG. 4B, a block diagram of selected elements of an embodiment of process diagram 401 is illustrated. In FIG. 4B, process diagram 401 depicts operations for I/O acceleration in information handling system 100 (see FIGS. 1 and 2), as described herein. Specifically, process diagram 401 depicts I/O acceleration for a write operation to a storage resource by app 202 in which DMA programming is performed by SVA storage driver 204.

In process diagram 401, app 202 may issue a write-to-file request (WR) for a target file stored on a target device at step 402 to guest OS 108, which occurs in the address space A1 or G-OS(A1). Then, guest OS 108 translates the WR from G-OS(A1) to G-OS(A2) at step 404 and forwards the WR to virtual file system (VFS) 246. Additionally at step 404, a file pointer and offset included with the WR is converted to a virtual disk block address for the target device on which the target file for the WR is stored. At step 406, VFS 246 translates the virtual disk block address to a physical disk block address, translates the WR from G-OS(A2) to HV(A4), and sends the WR to HV storage driver 248, along with the translated addresses. Additionally, at step 406, VFS 246 pins HV(A4) for write data to write for the WR. At step 440 HV storage driver 248 loads CPU2 NTB 221 with the HV(A4) address and sends an NTB message (i.e., ring doorbell) with the physical block address, a buffer size, and the HV(A4) address (i.e., WR info) via CPU2 NTB 221. At step 442, the NTB message is received by CPU1 NTB 221. At step 444-1, CPU1 NTB 221 interrupts SVA storage driver 204 with the WR info. At step 444-2, SVA OS 110 receives the WR info. At step 446, SVA OS 110 allocates a buffer in SVA(A1) of the buffer size given in the WR info and records a corresponding SVA(A2) address for the buffer. At step 448, SVA storage driver 204 loads CPU1-DMA 240-1 with the SVA(A2) address pinned for the buffer. At step 450, the DMA operation is started. At step 452, the DMA operation proceeds with a transfer of the write data from HV(A4) to CPU2 NTB 221. At step 454, the DMA operation proceeds with a transfer of the write data from CPU2 NTB 221 to CPU1 NTB 221. At step 456, the DMA operation proceeds with a transfer of the write data from CPU1 NTB 221 to SVA(A2) at SVA storage driver 204. At step 458, CPU1 DMA 240-1 interrupts SVA storage driver 204 with an interrupt indicating that the DMA operation is completed and that the write data are in SVA(A2). Then, the write data may be written to the target device (not shown). At step 460-1, SVA storage driver 204 performs an NTB ring doorbell at CPU1 NTB 221. At step 460-2, CPU1 NTB 221 rings a doorbell at CPU1 NTB 221. At step 462, CPU2 NTB 221 interrupts HV storage driver 248 with a WR completion message. At step 434, HV storage driver 248 sends a WR completion message to VFS 246. At step 436, VFS 246 sends a WR completion message to G-OS 108. At step 438, G-OS 108 sends a WR completion message to app 102.

Figure 5A:
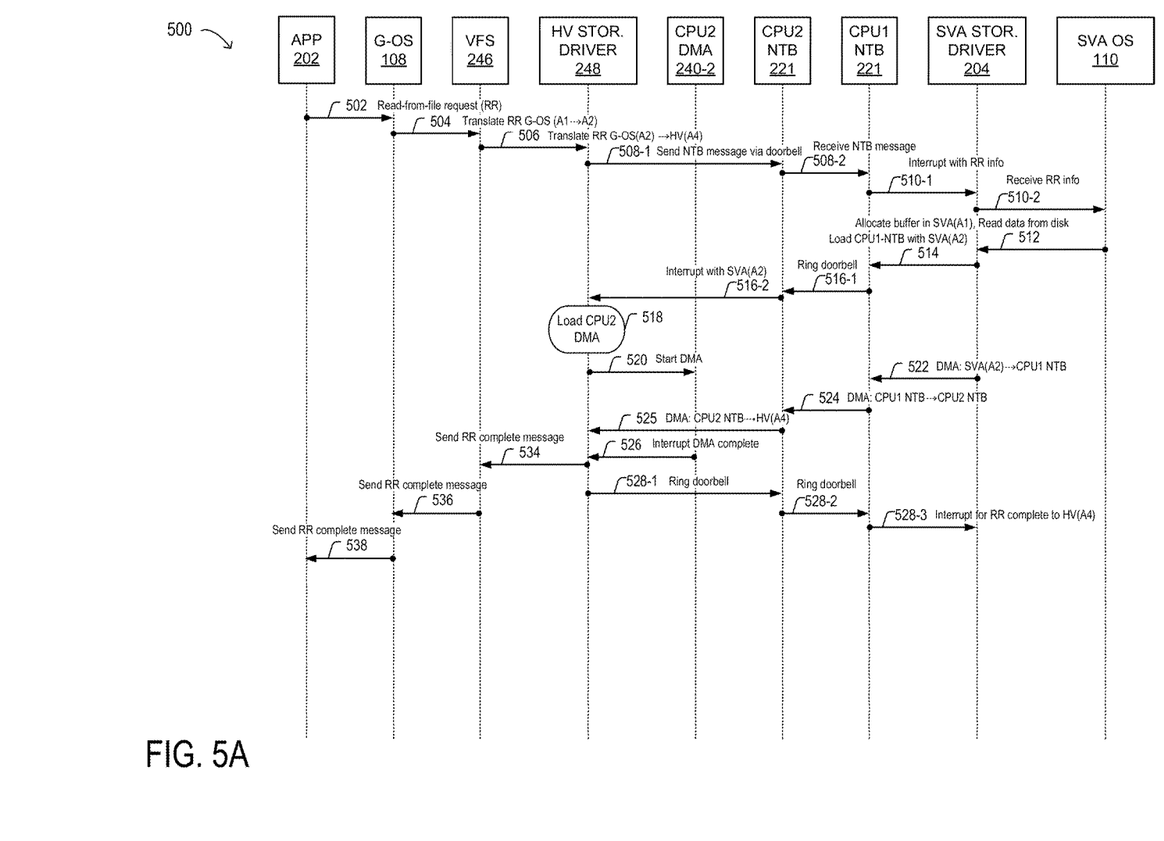
FIG. 5A is a process diagram of selected elements of an embodiment of I/O acceleration, as described herein, for a read operation.

Referring now to FIG. 5A, a block diagram of selected elements of an embodiment of process diagram 500 is illustrated. In FIG. 5A, process diagram 500 depicts operations for I/O acceleration in information handling system 100 (see FIGS. 1 and 2), as described herein. Specifically, process diagram 500 depicts I/O acceleration for a read operation from a storage resource by app 202 in which DMA programming is performed by HV storage driver 248.

In process diagram 500, app 202 may issue a read-from-file request (RR) from a target file stored on a target device at step 502 to guest OS 108, which occurs in the address space A1 or G-OS(A1). Then, guest OS 108 translates the RR from G-OS(A1) to G-OS(A2) at step 504 and forwards the RR to virtual file system (VFS) 246. Additionally at step 504, a file pointer and offset included with the RR is converted to a virtual disk block address for the target device on which the target file for the RR is stored. At step 506, VFS 246 translates the virtual disk block address to a physical disk block address, translates the RR from G-OS(A2) to HV(A4), and sends the RR to HV storage driver 248, along with the translated addresses. Additionally, at step 506, VFS 246 pins HV(A4) for read data to read for the RR. At step 508-1 HV storage driver 248 sends an NTB message (i.e., ring doorbell) with the physical block address and a buffer size (i.e., RR info) via CPU2 NTB 221. At step 508-2, the NTB message is received by CPU1 NTB 221. At step 510-1, CPU1 NTB 221 interrupts SVA storage driver 204 and SVA storage driver 204 reads the NTB message with the RR info. At step 510-2, SVA OS 110 receives the RR info. At step 512, SVA OS 110 allocates a buffer in SVA(A1) of the buffer size given in the RR info, reads data from the target file, and provides the SVA(A1) address to SVA storage driver 204. At step 514, SVA storage driver 204 translates a corresponding SVA(A2) address from SVA(A1), loads CPU1-NTB 221 with the SVA(A2) address, pins SVA(A2) for the buffer, and rings a doorbell at CPU1 NTB 221. Then, at step 516-1, CPU1 NTB 221 performs an NTB ring doorbell at CPU2 NTB 221. At step 516-2, CPU2 NTB 221 interrupts HV storage driver 248 with the SVA(A2) address. At step 518, HV storage driver 248 loads CPU2 DMA 240-2 for the DMA operation. At step 520, the DMA operation is started. At step 522, the DMA operation proceeds with a transfer of the read data from SVA(A2) to CPU1 NTB 221. At step 524, the DMA operation proceeds with a transfer of the read data from CPU1 NTB 221 to CPU2 NTB 221. At step 525, the DMA operation proceeds with a transfer of the read data from CPU2 NTB 221 to HV(A4) at HV storage driver 248. The read data are then accessible by app 202 (not shown). At step 526, CPU2 DMA 240-2 interrupts HV storage driver 248 with an interrupt indicating that the DMA operation is completed. At step 528-1, HV storage driver 248 performs an NTB ring doorbell at CPU2 NTB 221. At step 528-2, CPU2 NTB 221 rings a doorbell at CPU1 NTB 221. At step 528-3, CPU1 NTB 221 interrupts SVA storage driver 204 for the read data in HV(A4) (RR complete). At step 534, HV storage driver 248 sends a RR completion message to VFS 246. At step 536, VFS 246 sends a RR completion message to G-OS 108. At step 538, G-OS 108 sends a RR completion message to app 102.

Figure 5B:
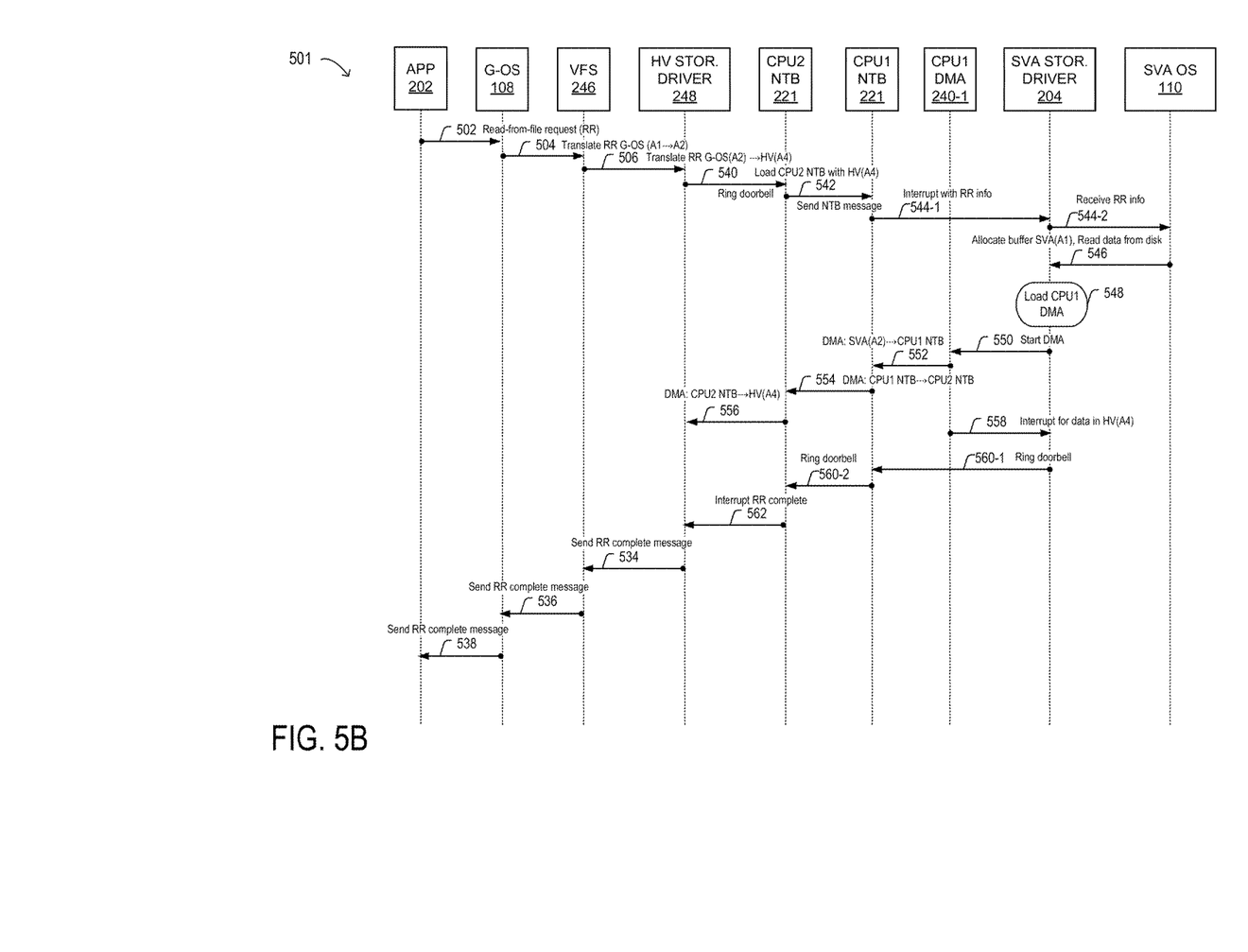
FIG. 5B is a process diagram of selected elements of an embodiment of I/O acceleration, as described herein, for a read operation.

Referring now to FIG. 5B, a block diagram of selected elements of an embodiment of process diagram 501 is illustrated. In FIG. 5B, process diagram 501 depicts operations for I/O acceleration in information handling system 100 (see FIGS. 1 and 2), as described herein. Specifically, process diagram 501 depicts I/O acceleration for a read operation from a storage resource by app 202 in which DMA programming is performed by SVA storage driver 204.

In process diagram 501, app 202 may issue a read-from-file request (RR) for a target file stored on a target device at step 502 to guest OS 108, which occurs in the address space A1 or G-OS(A1). Then, guest OS 108 translates the RR from G-OS(A1) to G-OS(A2) at step 504 and forwards the RR to virtual file system (VFS) 246. Additionally at step 504, a file pointer and offset included with the RR is converted to a virtual disk block address for the target device on which the target file for the RR is stored. At step 506, VFS 246 translates the virtual disk block address to a physical disk block address, translates the RR from G-OS(A2) to HV(A4), and sends the RR to HV storage driver 248, along with the translated addresses. Additionally, at step 506, VFS 246 pins HV(A4) for read data to read for the RR. At step 540 HV storage driver 248 loads CPU2 NTB 221 with the HV(A4) address and sends an NTB message (i.e., ring doorbell) with the physical block address, a buffer size, and the HV(A4) address (i.e., RR info) via CPU2 NTB 221. At step 542, the NTB message is received by CPU1 NTB 221. At step 544-1, CPU1 NTB 221 interrupts SVA storage driver 204 with the RR info. At step 544-2, SVA OS 110 receives the RR info. At step 546, SVA OS 110 allocates a buffer in SVA(A1) of the buffer size given in the RR info, reads data from the target file, and provides the SVA(A1) address to SVA storage driver 204. At step 548, SVA storage driver 204 translates a corresponding SVA(A2) address from SVA(A1), loads CPU1-DMA 240-1 with the SVA(A2) address, pins SVA(A2) for the buffer. At step 550, the DMA operation is started. At step 552, the DMA operation proceeds with a transfer of the read data from SVA(A2) to CPU1 NTB 221. At step 554, the DMA operation proceeds with a transfer of the read data from CPU1 NTB 221 to CPU1 NTB 221. At step 556, the DMA operation proceeds with a transfer of the write data from CPU2 NTB 221 to HV(A4) at HV storage driver 248. At step 558, CPU1 DMA 240-1 interrupts SVA storage driver 204 with an interrupt indicating that the DMA operation is completed and that the read data are in HV(A4). At step 560-1, SVA storage driver 204 performs an NTB ring doorbell at CPU1 NTB 221. At step 560-2, CPU1 NTB 221 rings a doorbell at CPU1 NTB 221. At step 562, CPU2 NTB 221 interrupts HV storage driver 248 with a RR completion message. At step 534, HV storage driver 248 sends a RR completion message to VFS 246. At step 536, VFS 246 sends a RR completion message to G-OS 108. At step 538, G-OS 108 sends a RR completion message to app 102.

Figure 6:
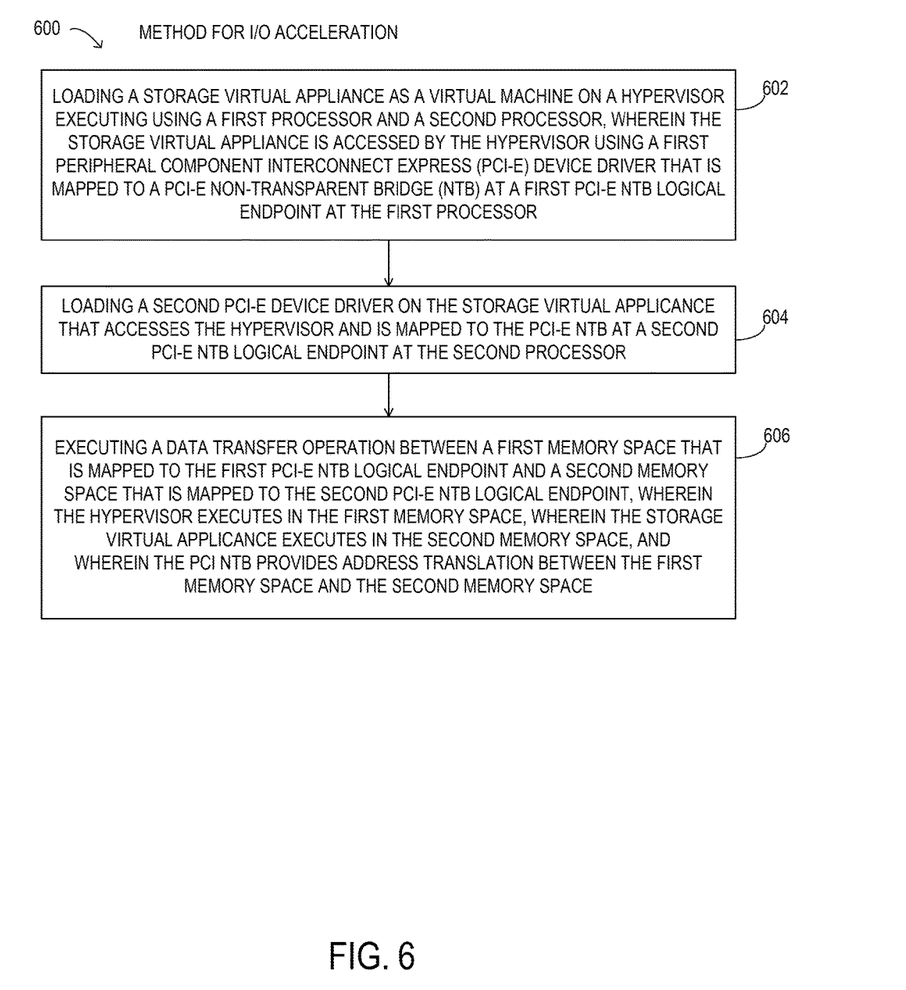
FIG. 6 is flowchart depicting selected elements of an embodiment of a method for I/O acceleration, as described herein.

Referring now to FIG. 6, a block diagram of selected elements of an embodiment of method 600 for I/O acceleration in a virtualized information handling system, as described herein, is depicted in flowchart form. Method 600 may be performed using information handling system 100 (see FIGS. 1 and 2). It is noted that certain operations described in method 600 may be optional or may be rearranged in different embodiments.

In FIG. 6, method 600 may begin by loading (operation 602) a storage virtual appliance as a virtual machine on a hypervisor executing using a first processor and a second processor, wherein the storage virtual appliance is accessed by the hypervisor using a first Peripheral Component Interconnect Express (PCI-E) device driver that is mapped to a PCI-E non-transparent bridge (NTB) at a first PCI-E NTB logical endpoint at the first processor. A second PCI-E device driver may be loaded (operation 604) on the storage virtual appliance that accesses the hypervisor and is mapped to the PCI-E NTB at a second PCI-E NTB logical endpoint at the second processor. A data transfer operation may be executed (operation 606) between a first memory space that is mapped to the first PCI-E NTB logical endpoint and a second memory space that is mapped to the second PCI-E NTB logical endpoint, wherein the hypervisor executes in the first memory space, wherein the storage virtual appliance executes in the second memory space, and wherein the PCI NTB provides address translation between the first memory space and the second memory space.

As described in detail herein, disclosed methods and systems for I/O acceleration on a virtualized information handling system include loading a storage virtual appliance as a virtual machine on a hypervisor. The hypervisor may execute using a first processor and a second processor. The storage virtual appliance is accessed by the hypervisor using a PCI-E device driver that is mapped to a first PCI-E NTB logical endpoint at the first processor. A second PCI-E device driver may be loaded on the storage virtual appliance that accesses the hypervisor and is mapped to a second PCI-E NTB logical endpoint at the second processor. A data transfer operation may be executed between a first memory space that is mapped to the first PCI-E NTB logical endpoint and a second memory space that is mapped to the second PCI-E NTB logical endpoint. The data transfer operation may be a read or a write operation.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method executed using at least two processors, including a first processor and a second processor, the method comprising:
   loading a storage virtual appliance as a virtual machine on a hypervisor executing using the first processor and the second processor, wherein the storage virtual appliance is accessed by the hypervisor using a second Peripheral Component Interconnect Express (PCI-E) device driver that is mapped to a PCI-E non-transparent bridge (NTB) at a second PCI-E NTB logical endpoint at the second processor;
   loading a first PCI-E device driver on the storage virtual appliance that accesses the hypervisor and is mapped to the PCI-E NTB at a first PCI-E NTB logical endpoint at the first processor;
   loading a first storage driver on the storage virtual appliance that accesses a first central processing unit (CPU) direct memory access (DMA) of the first processor for a first DMA data transfer operation of a plurality of first CPU DMA data transfer operations; and
   executing the first DMA data transfer operation between a first memory space that is mapped to the first PCI-E NTB logical endpoint and a second memory space that is mapped to the second PCI-E NTB logical endpoint, wherein the hypervisor executes in the second memory space, wherein the storage virtual appliance executes in the first memory space, and wherein the PCI-E NTB provides address translation between the first memory space and the second memory space.

2. The method of claim 1, wherein the first DMA data transfer operation is initiated from one of: the first memory space and the second memory space.

3. The method of claim 1, further comprising:
   loading a second storage driver on the hypervisor that accesses a second central processing unit (CPU) direct memory access (DMA) of the second processor for a second DMA data transfer operation of a plurality of second CPU DMA data transfer operations; and
   executing the second DMA data transfer operation between the first memory space and the second memory space.

4. The method of claim 3, wherein the first DMA data transfer operation occurs from the first memory space to the second memory space.

5. The method of claim 3, wherein the first DMA data transfer operation occurs from the second memory space to the first memory space.

6. The method of claim 1, wherein the first DMA data transfer operation includes a programmed input/output (PIO).

7. The method of claim 1, wherein the first processor is associated with a first physical memory bank and the second processor is associated with a second physical memory bank;
   wherein loading the storage virtual appliance includes specifying the first processor for the first CPU DMA data transfer operations; and
   wherein the first PCI-E NTB logical endpoint is exclusively mapped to the first physical memory bank.

8. An article of manufacture comprising a non-transitory computer-readable medium storing instructions, that, when executed by at least two processors, including a first processor and a second processor, cause the two processors to:
   load a storage virtual appliance as a virtual machine on a hypervisor executing using the first processor and the second processor, wherein the storage virtual appliance is accessed by the hypervisor using a second Peripheral Component Interconnect Express (PCI-E) device driver that is mapped to a PCI-E non-transparent bridge (NTB) at a second PCI-E NTB logical endpoint at the second processor;
   load a first PCI-E device driver on the storage virtual appliance that accesses the hypervisor and is mapped to the PCI-E NTB at a first PCI-E NTB logical endpoint at the first processor;
   load a first storage driver on the storage virtual appliance that accesses a first central processing unit (CPU) direct memory access (DMA) of the first processor for a first DMA data transfer operation of a plurality of first CPU DMA data transfer operations; and
   execute the first DMA data transfer operation between a first memory space that is mapped to the first PCI-E NTB logical endpoint and a second memory space that is mapped to the second PCI-E NTB logical endpoint, wherein the hypervisor executes in the second memory space, wherein the storage virtual appliance executes in the first memory space, and wherein the PCI-E NTB provides address translation between the first memory space and the second memory space.

9. The article of manufacture of claim 8, wherein the first DMA data transfer operation is initiated from one of: the first memory space and the second memory space.

10. The article of manufacture of claim 8, further comprising:

load a second storage driver on the hypervisor that accesses a second central processing unit (CPU) direct memory access (DMA) of the second processor for a second DMA data transfer operation of a plurality of second CPU DMA data transfer operations; and execute the second DMA data transfer operation between the first memory space and the second memory space.

11. The article of manufacture of claim 10, wherein the first DMA data transfer operation occurs from the first memory space to the second memory space.

12. The article of manufacture of claim 10, wherein the first DMA data transfer operation occurs from the second memory space to the first memory space.

13. The article of manufacture of claim 8, wherein the first DMA data transfer operation includes a programmed input/output (PIO).

14. The article of manufacture of claim 8, wherein the first processor is associated with a first physical memory bank and the second processor is associated with a second physical memory bank;
   wherein loading the storage virtual appliance includes specifying the first processor for the first CPU DMA data transfer operations; and
   wherein the first PCI-E NTB logical endpoint is exclusively mapped to the first physical memory bank.

15. An information handling system comprising:
   a processor subsystem having access to a memory subsystem, the processor subsystem including a first processor and a second processor, wherein the memory subsystem stores instructions executable by the processor subsystem, that, when executed by the processor subsystem, cause the processor subsystem to:
      load a storage virtual appliance as a virtual machine on a hypervisor executing using the first processor and the second processor, wherein the storage virtual appliance is accessed by the hypervisor using a second Peripheral Component Interconnect Express (PCI-E) device driver that is mapped to a PCI-E non-transparent bridge (NTB) at a second PCI-E NTB logical endpoint at the first second processor;
      load a first PCI-E device driver on the storage virtual appliance that accesses the hypervisor and is mapped to the PCI-E NTB at a first PCI-E NTB logical endpoint at the first processor;
      load a first storage driver on the storage virtual appliance that accesses a first central processing unit (CPU) direct memory access (DMA) of the first processor for a first DMA data transfer operation of a plurality of first CPU DMA data transfer operations; and
      execute the first DMA data transfer operation between a first memory space that is mapped to the first PCI-E NTB logical endpoint and a second memory space that is mapped to the second PCI-E NTB logical endpoint,
   wherein the hypervisor executes in the second memory space,
   wherein the storage virtual appliance executes in the first memory space, and
   wherein the PCI-E NTB provides address translation between the first memory space and the second memory space.

16. The information handling system of claim 15, wherein the first DMA data transfer operation is initiated from one of: the first memory space and the second memory space.

17. The information handling system of claim 15, further comprising:
   load a second storage driver on the hypervisor that accesses a second central processing unit (CPU) direct memory access (DMA) of the second processor for a second DMA data transfer operation of a plurality of second CPU DMA data transfer operations; and
   execute the second DMA data transfer operation between the first memory space and the second memory space.

18. The information handling system of claim 17, wherein the first DMA data transfer operation occurs from the first memory space to the second memory space.

19. The information handling system of claim 17, wherein the first DMA data transfer operation occurs from the second memory space to the first memory space.

20. The information handling system of claim 15, wherein the first DMA data transfer operation includes a programmed input/output (PIO).

21. The information handling system of claim 15, wherein the first processor is associated with a first physical memory bank and the second processor is associated with a second physical memory bank;
   wherein loading the storage virtual appliance includes specifying the first processor for the first CPU DMA data transfer operations; and
   wherein the first PCI-E NTB logical endpoint is exclusively mapped to the first physical memory bank.

* * * * *